Figure 1:
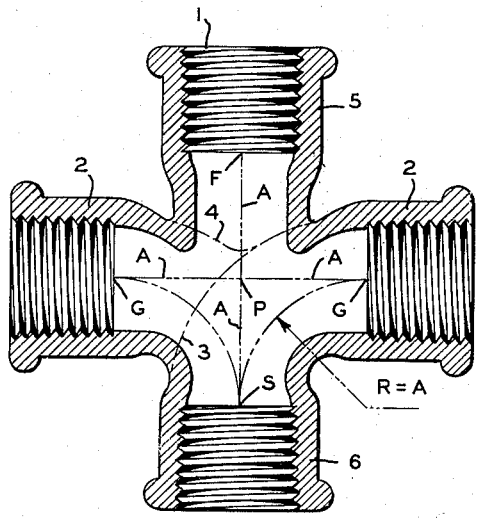

Aug. 7, 1951   G. A. TEGLUND   2,562,967
PIPE FITTING
Filed Sept. 16, 1947   3 Sheets-Sheet 1

*INVENTOR.*
GUSTAV ARTHUR TEGLUND
BY
*James C. Marble*
ATTORNEY

Aug. 7, 1951     G. A. TEGLUND     2,562,967
PIPE FITTING
Filed Sept. 16, 1947     3 Sheets-Sheet 2

INVENTOR.
GUSTAV ARTHUR TEGLUND
BY
*Jarvis O. Marble*
ATTORNEY

Aug. 7, 1951  G. A. TEGLUND  2,562,967
PIPE FITTING

Filed Sept. 16, 1947  3 Sheets-Sheet 3

INVENTOR.
GUSTAV ARTHUR TEGLUND
BY
ATTORNEY

Patented Aug. 7, 1951

2,562,967

UNITED STATES PATENT OFFICE 2,562,967

PIPE FITTING

Gustav Arthur Teglund, Gustavasberg, Sweden

Application September 16, 1947, Serial No. 774,280
In Sweden September 18, 1946

6 Claims. (Cl. 285—210)

In the house-building trade there is a well-known tendency to extend the use of building materials which have been manufactured into finished parts fit for immediate assemblage. From various points of view this manner of building affords obvious advantages needing no particular presentation.

With reference to pipe installations, however, unsurmountable difficulties have been experienced in all attempts at producing finished pipe elements on a factory scale to be supplied fitted for immediate assemblage on the building site, because the pipe fittings available up to the present time exclude every possibility of using such finished pipe elements. The calculation of the lengths into which the pipes have to be cut is a most time-wasting and somewhat uncertain task due to the extremely irregular lengthening measures which will appear in the piping as a result of the insertion of the pipe fittings. The general practice, therefore, is to have the cutting and threading of the pipes performed at the place of installation. On plausible grounds it has been considered technically impossible to supply piping installations as finished parts ready for assemblage or, at all events, impossible to do so and at the same time to ensure the economy required to justify the complicated precalculation where the latter is possible. Hence piping installations in practice are always carried out as handicraft. However, work studies on building sites show that the plumber employed cannot avoid an abnormal waste of time as long as he is to use only such pipe fittings as give from one case to another such varying displacement of the lengthening measures that the determination of the actual pipe length only can be performed on the building site. It is evident, too, that no facilitation whatever would be gained by binding such variables as different heights of storeys, different locations of radiators, etc., to any fixed standard patterns, as is occasionally suggested with a view to greater simplicity.

The object of the present invention is to eliminate the difficulties which until now have been experienced in all precalculation of piping installations. The invention, therefore, consists in a special design of the fittings required in installations of piping, a design permitting an easy predetermination of the pipe-building measures. Thus the invention aims at the actual realization of the possibility to supply ready-made pipes together with the pipe fittings, all pipes being cut and threaded from the factory and fit for immediate assemblage, requiring no alterations or adjustments to local peculiarities. The economical aspect of this possibility, as regards building costs, is important.

The invention refers to such pipe fittings as are designed in an elbow shape, or provided with branchings for the lateral joining of a branch pipe to a main pipe. Such a pipe fitting designed according to the invention is characterized in that the building measures by which the fitting lengthens the separate, joined pipes, reckoning from the intersection point of the pipe axes to the respective ends of the pipes in the directions of main and branch pipes respectively, amount to $n \cdot A$, where $n$ is a whole number adjusted to the main pipe diameter and $A$ is a standard length chosen for a base common to pipe fittings intended for current dimensions of pipes. This standard length $A$ should be preferably put in a whole number relation to the module length suggested for building standardisation, i. e. $A$ equivalent to a ¼ module, one module being defined to equal 10 cm. or 4 inches. Thus it will be possible to express the pipe lengths, plus the building measures by which the pipe fittings increase the pipe lengths, in metrical measures, or in feet and inches, thus admitting of an extensive international application. It should be observed that another value may of course be substituted for the suggested $A=25$ mm.$=1$".

The invention also covers pipe fittings which, in addition to being provided with a connection for a branch pipe, are designed for the joining of a lengthening pipe to the main pipe in the direction of the latter. In such a pipe fitting, according to the invention, $n \cdot A$ constitutes the building measure for the joined lengthening pipe part. Such a pipe fitting may also be designed so that this building measure is equal to 0 for the joined lengthening pipe part, especially when the main pipe is lengthened with a pipe having a smaller diameter.

Characteristic of pipe fitting designed according to the invention is also the fact that a main pipe connection part of the coupling passes into a branch-pipe connection part describing a curve of which the radius is $n \cdot A$.

As an example intended to illustrate the great practical value of the invention, the calculation of the piping system for a house of several storeys may be chosen. A main pipe stem is to be raised through all the storeys and to be branched off in each floor-joint structure. The length of the main pipe for each storey will then be equal to the height of the storey less $n \cdot A$. Seeing that storey heights are susceptible of easy standardisation at fixed values, it will be recognized that the invention makes it possible to maintain stocks of ready-made pipe lengths produced on a factory scale, a possibility previously considered unrealizable. Also as regards the positioning of radiators, tappings, etc., a standardisation is perfectly practicable, and it will consequently be possible to have also the branch piping supplied ready-made in exact lengths from the factory. Transverse connections of parallel main pipes, are simplified, too, by the exact alignment of the centres of the branch connections. The invention thus introduces an arrangement of such a piping installation that the indication of length and height dimensions fits into a module system representing a net of coordinates the sides of which are A modules.

It makes no difference to the applicability of the invention whether the threading of the pipe fitting is external or internal or some other sort of fastening is used.

Figure 3:
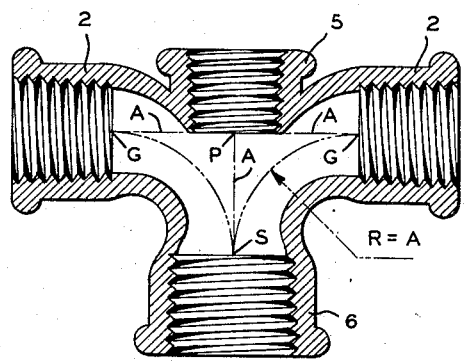
Figure 4:
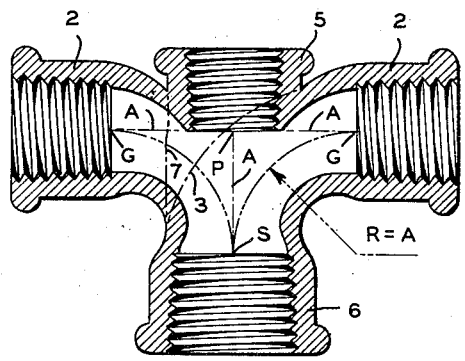
Figure 5:
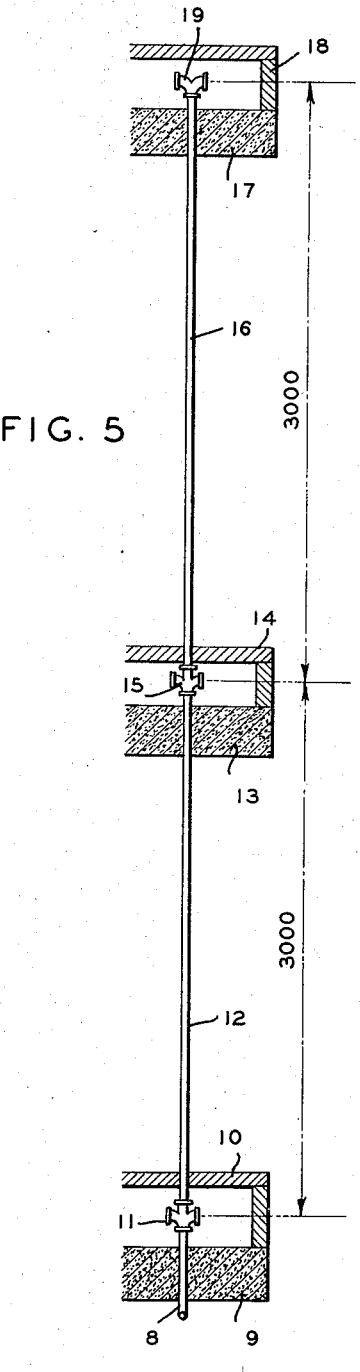
Figure 6:
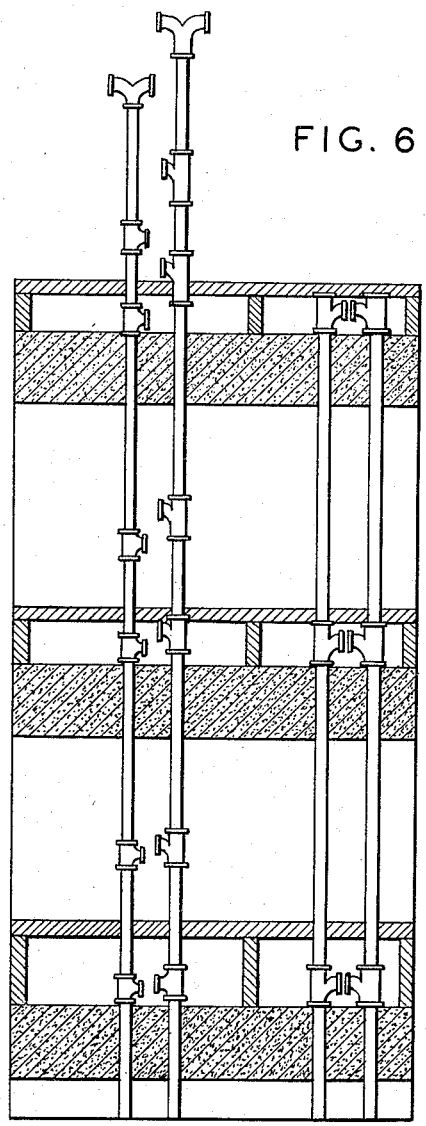

The invention is illustrated by the accompanying drawings, on which Figures 1-4 show pipe fittings designed according to the invention, Fig. 5 shows a calculation example for a piping installation, and Fig. 6 shows a comparison between pipe mains connected by pipe fittings of conventional types and mains connected by the corresponding parts according to the invention.

Fig. 1 shows an unreduced cross fitting for the smallest pipe dimensions by means of which four pipes of identical diameter are connected crosswise. The fitting is shown with internal threading 1 for the pipe connections. As is seen, the extended pipe axes intersect each other in a common point P at the centre of the pipe fitting situated at a distance of A from the bottom of each thread. It will thus be seen that the threads or other suitable connecting means serve to limit the movement of the pipes toward the center of the fitting and to thereby locate the extremities of the pipes with an accuracy well within the tolerances permissible in plumbing installations in which the fittings of this invention are intended to be used. The passages between the lower main-pipe connection 6 to the two side-junctions 2 forms each a curve the radius of which is equal to A. From the end S of the lower main pipe the distance to the axes of the branch pipes, as displaced by the pipe fitting, is $PS=A$, and the ends G of the branch pipes will be positioned at a distance of $PG=A$ from the axis of the main pipe. A lengthening pipe joined to the main pipe by the pipe connection 5 will be displaced by the pipe fitting to a distance of $PS+FP=A+A$ from the end S of the lower main pipe. A dash-traced contour line 3 indicates the shape of an elbow fitting designed according to the invention, and the dash-dotted contour line 4 indicates the shape of a T fitting with two side branches 2, 2.

Figure 2:
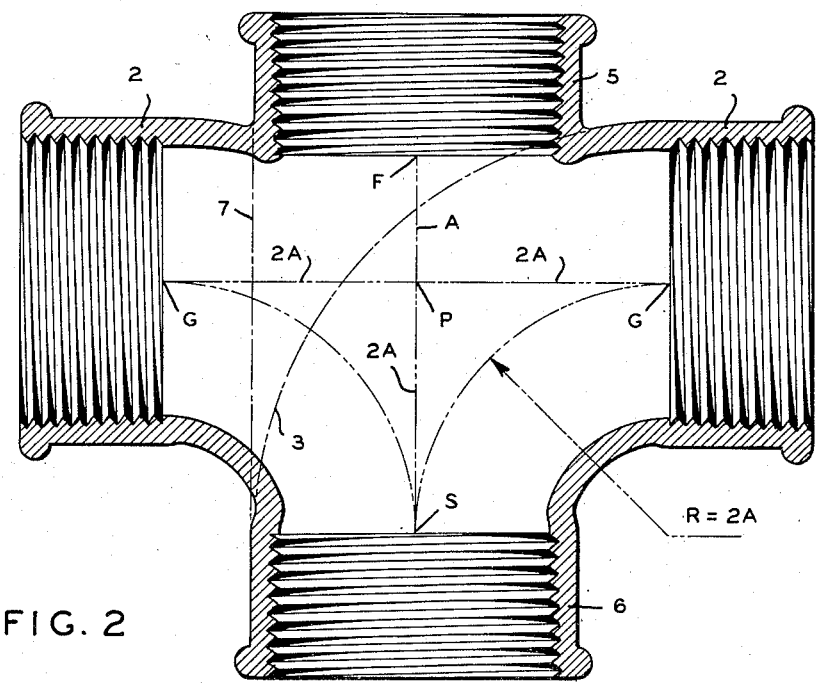

Fig. 2 shows an unreduced cross fitting for pipes somewhat thicker than those of Fig. 1. The dash-traced contour line 3 indicates an elbow fitting, and the dash-dotted contour line 7 a T fitting. Here the intersection point P of the axes of the pipes is at the distance of $PS=2A$ from the end of the lower main pipe as well as from the ends, S and G, of the branch pipes, and at the same distance as in Fig. 1, or $FP=A$, from the end of the joined main lengthening pipe. The radius of the curve forming the passage to the branch pipes is $R=2A$.

For the following pipe dimensions the pipe-building measures PS, PG and R have been changed into 3A and then into 4A. For practical application the following dimensional relations are considered in the case of unreduced pipe-fittings:

| Pipe dimensions | PS | PG | FP | R |
|---|---|---|---|---|
| Up to and inclusive 1″ | A | A | A | A |
| Over 1″ and inclusive 2″ | 2A | 2A | A | 2A |
| Over 2″ and inclusive 3″ | 3A | 3A | A | 3A |
| Over 3″ and inclusive 4″ | 4A | 4A | A | 4A | in the above table $A=25$ mm.$=1''$.

However, as visible in Fig. 3, showing a cross fitting, it is also possible to let the upper main lengthening pipe 5 end at the intersection point P of the pipe axes. In this case the pipe-building measure FP is eliminated whereby the total lengthening measure when joining the different main pipe parts with the pipe fitting is simplified into $n \cdot A$ instead of $(n+1) \cdot A$. It might be advantageous to be able invariably to reckon on that the pipe fittings lengthen the joined main pipe parts with $n \cdot A$, instead of with $(n+1) \cdot A$ as has been described above in designs of unreduced fittings. Both designs have been shown as examples, however, in view of possible considerations of appearance that may affect the choice.

Fig. 4 shows the construction of pipe fittings for connections including one or several pipes of reduced diameter. The full contour lines represent a cross fitting, the dash-traced line 3 an elbow fitting, and the dash-dotted line 7 a T fitting. The pipe-building measures PS, PG and R agree with the preceding table in which, however, the measure FP is omitted.

Fig. 5 illustrates the simplification rendered possible by the invention in the calculation of a piping installation. A pipe main rises through the sound boardings 9, 13, 17 and the joist structures 10, 14, 18 in a building of several storeys. The storey height is assumed to be 3000 mm., and it is desired to conceal the pipe branchings in the joist structures. The 2″ pipe 8 raised into the lowest joist structure 10 is branched off there by means of an unreduced cross fitting 11 of the dimension 2 x 2 x 2 x 2″. The 2″ pipe main 12 is extended upwards to the next joist structure 14 where another branching is arranged with a cross fitting 15 comprising one reduced pipe connection and dimensioned 2 x 2 x 1½ x 2″. The upward extension of the main pipe from here is formed by a 1½″ pipe 16 which enters the joist structure 18 of the top floor and ends in a two-way reduction T fitting 19 designed with two curved branches and dimensioned 1½ x 1 x 1″. The lengths cut of the pipes 12 and 16 will be exactly equal to the storey height less the building measures of the pipe fittings, in both cases$=3A$, i. e. the pipe lengths will amount to $3000-3A=2925$ mm., and it will be realized that this determination is very easy.

Fig. 6, finally, shows a comparison between main pipes mounted with pipe fittings of traditional types to the left in the figure and with pipe fittings according to the invention to the right in the figure. With identical lengths of the lengthening pipes the building measures of the pipe fittings hitherto used displace the branchings preventing them to occupy the positions desired in the joist structures. Transverse connections between the pipe branches imply difficulties due to the different height levels of the branches of respective pipe mains concerned.

The fittings according to the invention eliminate one inconvenience as well as the other.

What I claim is:

1. A pipe fitting for use in a standardized piping system including a main pipe, said fitting having an inlet connection for said main pipe and a coaxial outlet connection of reduced diameter, and diametrically opposed connections on said fitting for branch pipes, the center lines of said main and branch pipe connections intersecting at a common point, curved passages in said fitting communicating with said main and branch pipe connections, each of said connections including means for receiving the extremity of a pipe connected thereto, said fitting being so proportioned that the distance between the extremities of pipes connected to said opposed branch connections is twice the distance between said common point and the extremity of a pipe connected to said inlet connection, and the distance between the extremity of a pipe connected to said coaxial outlet connection and said common point of intersection is zero, irrespective of the size of the fitting.

2. A pipe fitting for use in a standardized piping system including a main pipe, said fitting having an inlet connection for said main pipe and a coaxial outlet connection of reduced diameter, and connections on said fitting for branch pipes, the center lines of said main and branch pipe connections intersecting at a common point, curved passages in said fitting communicating with said main and branch pipe connections, each of said connections including means for receiving the extremity of a pipe connected thereto, said fitting being so proportioned that the distance between the extremities of pipes connected to said branch connections and said common point of intersection is identical to the distance between said common point and the extremity of a pipe positively connected to said inlet connection, and the distance between the extremity of a pipe connected to said coaxial outlet connection and said common point of intersection is zero, irrespective of the size of the fitting.

3. A pipe fitting for use in a standardized piping system including a main pipe, said fitting having an inlet connection for said main pipe and a coaxial outlet connection, and connections on said fitting for branch pipes, the center lines of said main and branch pipe connections intersecting at a common point, curved passages in said fitting communicating with said main and branch pipe connections, each of said connections including means for receiving the extremity of a pipe connected thereto, said fitting being so proportioned that the distance between the extremities of pipes connected to said branch connections and said common point of intersection is identical to the distance between said common point and the extremity of a pipe connected to said inlet connection, irrespective of the size of the fitting.

4. A pipe fitting for use in a standardized piping system including a main pipe, said fitting having an inlet connection for said main pipe and a coaxial outlet connection of reduced diameter, and a connection on said fitting for a branch pipe, the center lines of said main and branch pipe connections intersecting at a common point, a curved passage in said fitting communicating with said main and branch pipe connections, each of said connections including means for receiving the extremity of a pipe connected thereto, said fitting being so proportioned that the distance between the extremity of a pipe connected to said branch connection and said common point of intersection is identical to the distance between said common point and the extremity of a pipe connected to said inlet connection and the distance between the extremity of a pipe connected to said coaxial inlet connection and said common point is zero, and the radius of said curved passage is identical to the distance between the extremity of each of said pipes and said common point of intersection irrespective of the size of the fitting.

5. A pipe fitting for use in a standardized piping system including a main pipe, said fitting having an inlet connection for said main pipe and a co-axial outlet connection and at least a connection on said fitting for a branch pipe, the center lines of said main and branch pipe connections intersecting at a common point, a curved passage in said fitting communicating with said main and branch pipe connections, each of said connections including means for receiving the extremity of a pipe connected thereto, said fitting being so proportioned that the distance between the extremity of a pipe connected to said branch connection and said common point of intersection is identical to the distance between said common point and the extremity of a pipe connected to said inlet connection and the distance between the extremity of a pipe connected to said co-axial outlet connection and said common point is a fraction of the distance between the extremities of each of said inlet and branch pipes and said common point of intersection irrespective of the size of the fitting, said fraction being the reciprocal of a whole number.

6. A pipe fitting for use in a standardized piping system including a main pipe, said fitting having an inlet connection for said main pipe and a co-axial outlet connection and at least a connection on said fitting for a branch pipe, the center lines of said main and branch pipe connections intersecting at a common point, a curved passage in said fitting communicating with said main and branch pipe connections, each of said connections including means for receiving the extremity of a pipe connected thereto, said fitting being so proportioned that the distance between the extremity of a pipe connected to said branch connection and said common point of intersection is identical to the distance between said common point and the extremity of a pipe connected to said inlet connection and the distance between the extremity of a pipe connected to said co-axial outlet connection and said common point is a fraction of the distance between the extremities of each of said inlet and branch pipes and said common point of intersection irrespective of the size of the fitting, at least one of said co-axial outlet and branch connections being of reduced diameter, and said fraction being the reciprocal of a whole number.

GUSTAV ARTHUR TEGLUND.

REFERENCES CITED

The following references are of record in the file of this patent:

UNITED STATES PATENTS

| Number | Name | Date |
| --- | --- | --- |
| 1,993,372 | Jones | Mar. 5, 1935 |